United States Patent [19]
Fujimoto

[11] Patent Number: 6,104,937
[45] Date of Patent: Aug. 15, 2000

[54] POWER-SAVING METHOD AND CIRCUIT

[75] Inventor: Shigeru Fujimoto, Tokyo, Japan

[73] Assignee: NEC Corporation, Japan

[21] Appl. No.: 08/814,296

[22] Filed: Mar. 10, 1997

[30] Foreign Application Priority Data

Mar. 8, 1996 [JP] Japan ................................. 8-051222

[51] Int. Cl.$^7$ ................................................. H04M 11/00
[52] U.S. Cl. ......................... 455/574; 455/343; 455/38.3
[58] Field of Search ................................. 455/574, 522, 455/343, 127, 38.3, 349

[56] References Cited

U.S. PATENT DOCUMENTS

| | | | |
|---|---|---|---|
| 4,449,248 | 5/1984 | Leslie et al. ............................ | 455/38.3 |
| 4,809,315 | 2/1989 | Oda ........................................ | 455/574 |
| 5,027,428 | 6/1991 | Ishiguro et al. ....................... | 455/38.3 |
| 5,203,020 | 4/1993 | Sato et al. .................................. | 455/68 |
| 5,428,820 | 6/1995 | Okada et al. ........................... | 455/38.3 |
| 5,519,757 | 5/1996 | Torin ........................................ | 455/550 |
| 5,519,762 | 5/1996 | Barlett ...................................... | 455/574 |
| 5,627,882 | 5/1997 | Chien et al. ............................. | 455/464 |
| 5,734,686 | 3/1998 | Kuramatsu ............................... | 375/368 |

FOREIGN PATENT DOCUMENTS 1-280931  11/1989  Japan .

*Primary Examiner*—William G. Trost
*Assistant Examiner*—Sonny Trinh
*Attorney, Agent, or Firm*—Ostrolenk, Faber, Gerb & Soffen, LLP

[57] ABSTRACT

In a communication network including a plurality of stations each having a transceiver, the transceiver includes transmission and reception detectors and a power controller. The power controller powers off the transceiver except for the transmission and reception detectors and powers on and off the transmission and reception detectors intermittently in a wait state where neither transmission nor reception is detected. In a communication state where transmission or reception is detected, the power controller powers on the transceiver.

16 Claims, 4 Drawing Sheets

PR : PREAMBLE
SYNC W: SYNC WORD
RQ : TRANSMISSION/ RECEPTION REQUEST

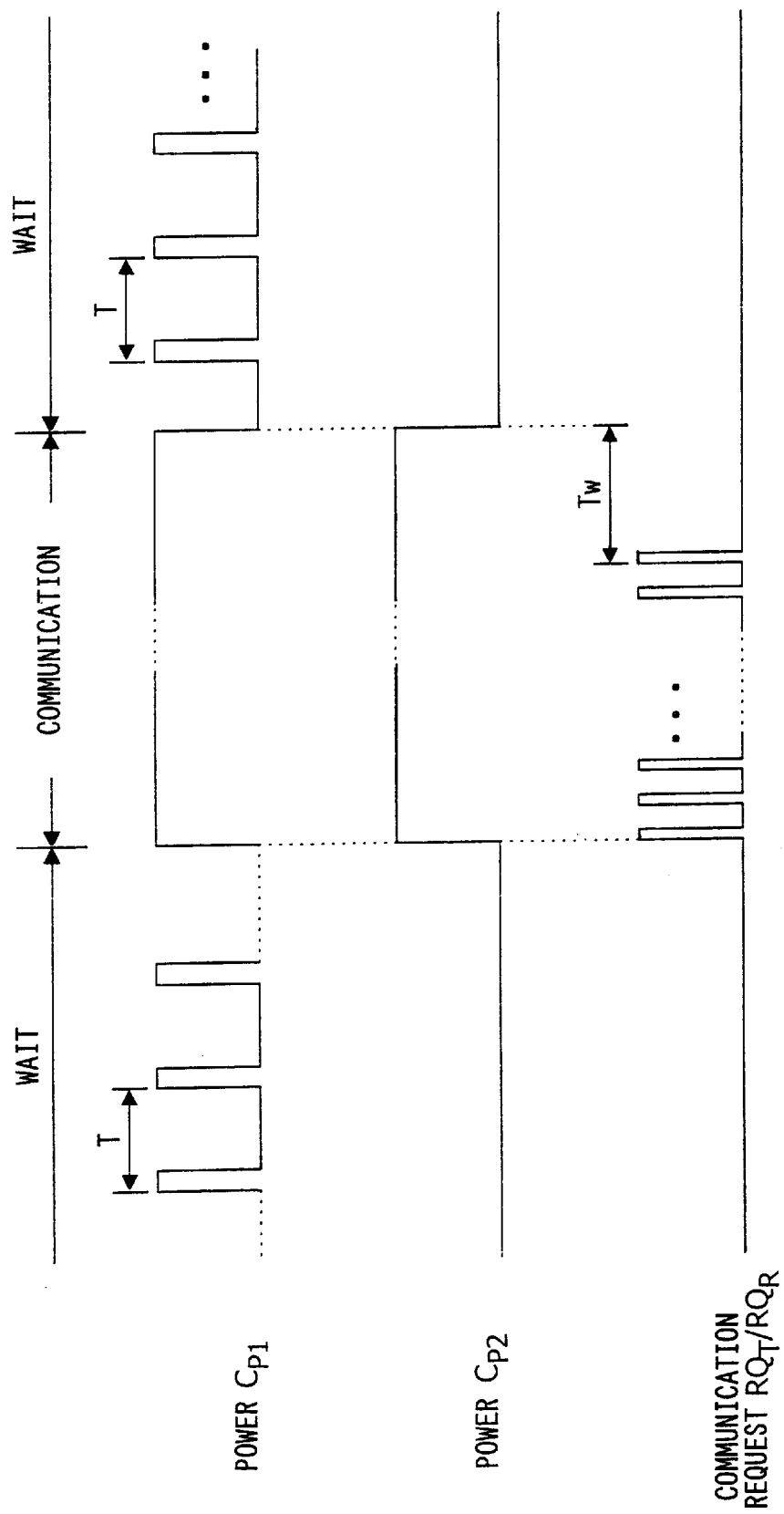

POWER-SAVING METHOD AND CIRCUIT

BACKGROUND OF THE INVENTION

1. Field of the Invention

The present invention relates to a wireless transceiver and, more specifically, to power-saving method and circuit for a wireless transceiver in a wireless communication network.

2. Description of the Related Art

In a radio communication system, power-saving control is necessary for a base station and a terminal, especially a battery-powered terminal. As an example of such a power-saving method, a power control system for use in a radio mobile terminal has been disclosed in Japanese Patent Unexamined Publication No. 1-280931. According to this conventional system, a radio receiver and a reception detector are intermittently supplied with power in a constant period, resulting in approximate a half the power consumption for reception. On the other hand, in the case where the power is off-hook, power is supplied to at least a response signal generator and a transmitter so as to allow transmission.

SUMMARY OF THE INVENTION

Although the conventional power-saving scheme is capable of reducing the power consumption of each mobile terminal, we found that it still has plenty of room for reduction in power consumption from the view point of the whole network including base stations and mobile terminals.

An object of the present invention is to provide power-saving method and system which achieve a substantial reduction in total power consumption of a network.

Another object of the present invention is to provide a transceiver which can reduce the power consumption in the case of a wait mode where it is waiting for reception or transmission.

According to an aspect of the present invention, a transceiver provided in each of stations forming a communication system, includes an input detector for detecting an input signal of the transceiver and a power controller for powering off the transceiver except the input detector in a first state in which the input signal is not detected and for powering on the transceiver in a second state which the input signal is detected. In cases where each station is in the first state, the transceiver except the input detector is powered off. Therefore, the total power consumption of the stations is reduced in the first state. The input detector may be powered on and off in a predetermined period in the first state.

According to another aspect of the present invention, in a communication network comprising a plurality of stations, a first station detects the presence or absence of transmission data according to power supplied to a first power supply line. In a first state where the transmission data is not detected, the first station powers off a second power supply line. In a second state where the transmission data is detected, the first station powers on the first and second power supply lines, and then transmits a frame signal comprising the transmission data and communication request data to a second station. On the other hand, the second station detects the presence or absence of the communication request data from reception data according to power supplied to a third power supply line. In a third state where the communication request data is not detected, the second station powers off a fourth power supply line. In a fourth state where the communication request data is detected, the second station powers on the third and fourth power supply lines. In the third state, the third power supply line may be powered on and off in a predetermined period.

BRIEF DESCRIPTION OF THE DRAWINGS

FIG. 4 is a timing chart showing an operation of the transceiver.

DESCRIPTION OF THE PREFERRED EMBODIMENTS

TRANSCEIVER

Figure 1:
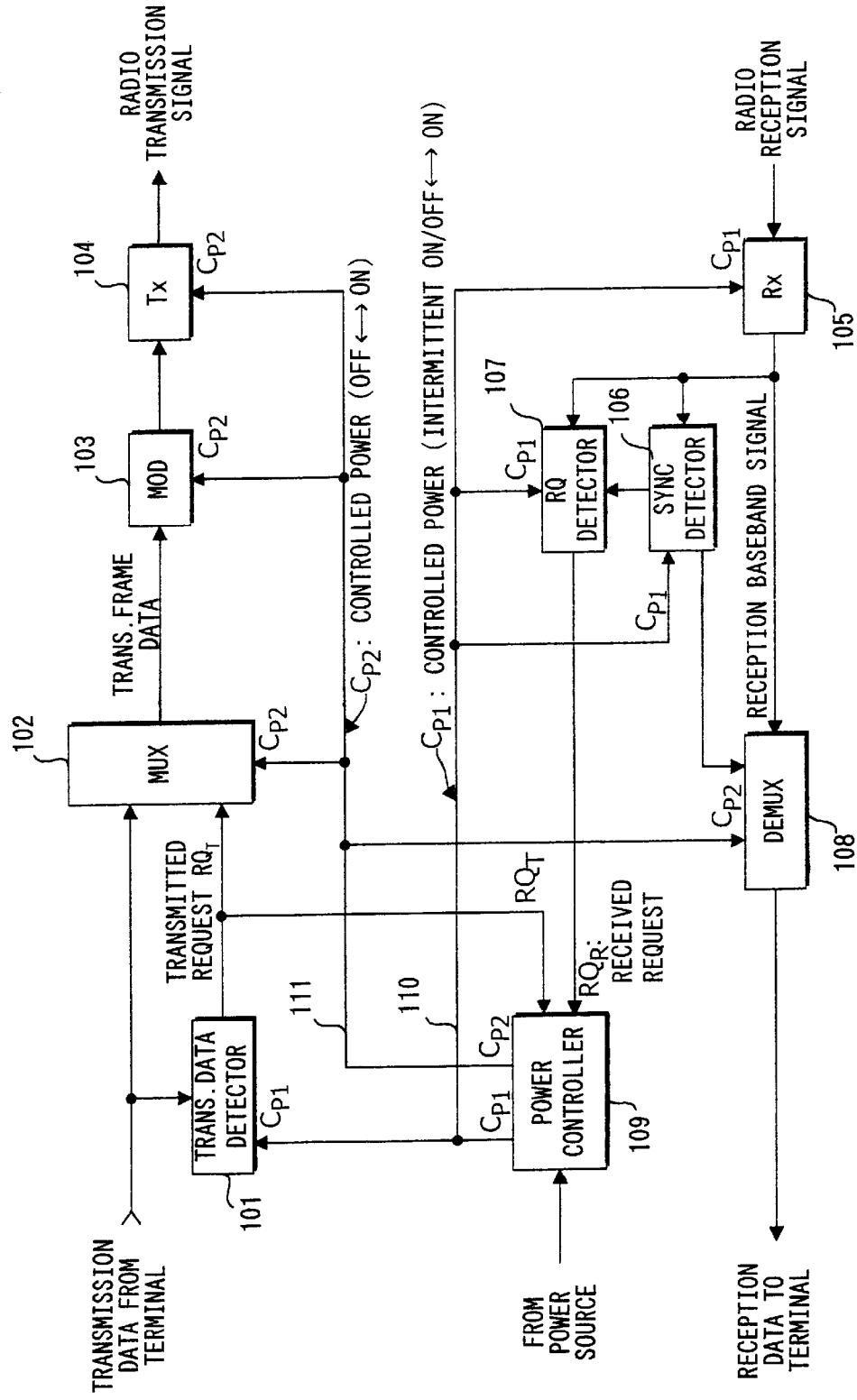
FIG. 1 is a block diagram showing an embodiment of a transceiver according to the present invention.

Referring to FIG. 1, a transceiver according to the present invention is comprised of a transmission circuit, a reception circuit and a power controller. The transmission circuit includes a transmission data detector 101 which detects the presence or absence of transmission data received from a terminal or a processor (not shown). When the transmission data is received, the transmission data detector 101 outputs communication request data $RQ_T$ to a multiplexer 102. The multiplexer 102 multiplexes the transmission data, the communication request data $RQ_T$ and other necessary information to produce a frame of transmission data which is output to a modulator 103. The modulator 103 modulates a local oscillation signal according to the transmission frame data received from the multiplexer 102. A transmission signal produced by the modulator 103 is converted to a transmission radio frequency and then amplified in power by a transmitter 104. The radio transmission signal is transmitted through an antenna (not shown).

The reception circuit includes a receiver 105 which receives a radio reception signal and demodulates a reception baseband signal therefrom. The reception baseband signal is supplied to a sync detector 106 and a communication request (RQ) detector 107. The sync detector 106 detects bit and frame synchronization from the reception baseband signal. According to the bit and frame synchronization, the RQ detector 107 detects communication request data $RQ_R$ from the reception baseband signal. The received communication request data $RQ_R$ is the same as a transmission communication request data $RQ_T$ which was transmitted by the opposite transceiver communicating with the relevant transceiver. In this embodiment, the transmitted and received communication request data $RQ_T$ and $RQ_R$ are the same data RQ, for instance, a predetermined bit pattern or flag. Further, according to the bit and frame synchronization, a demultiplexer 108 demultiplexes reception data from the reception baseband signal and outputs the reception data to the terminal or the processor.

The power controller 109 is connected to a power supply (not shown in this figure). The power controller 109 has a first power supply line 110 and a second power supply line 111 through which controlled powers $C_{P1}$ and $C_{P2}$ are supplied, respectively. The respective powers $C_{P1}$ and $C_{P2}$ are controlled according to the transmitted and received communication request data $RQ_T$ and $RQ_R$ as will be described later. The first power supply line 110 is connected to the transmission data detector 101, the receiver 105, the sync detector 106 and the RQ detector 107. The second power supply line 111 is connected to the multiplexer 102, the modulator 103, the transmitter 104, the demultiplexer 108 and other circuits of the transceiver.

More specifically, when neither the communication request data $RQ_T$ nor the communication request data $RQ_R$ is received, i.e, in a wait state, the power controller 109 intermittently supplies power to the first power supply line 110 in a predetermined period and does not supply power to the second power supply line 111. Therefore, the controlled power $C_{P1}$ of the first power supply line 110 is supplied to the transmission data detector 101, the receiver 105, the sync detector 106 and the RQ detector 107, and, at the same time, the other circuits are powered off. In other words, when in the wait state, the transceiver is looking at only the occurrence of transmission or reception in a predetermined period.

When the communication request data $RQ_T$ or the communication request data $RQ_R$ is received, the power controller 109 powers on the first and second power supply lines 110 and 111 to allow both transmission and reception of the transceiver. When neither the communication request data $RQ_T$ nor the communication request data $RQ_R$ is received for a predetermined time period, the power controller 109 returns back to the wait state.

Figure 2A:
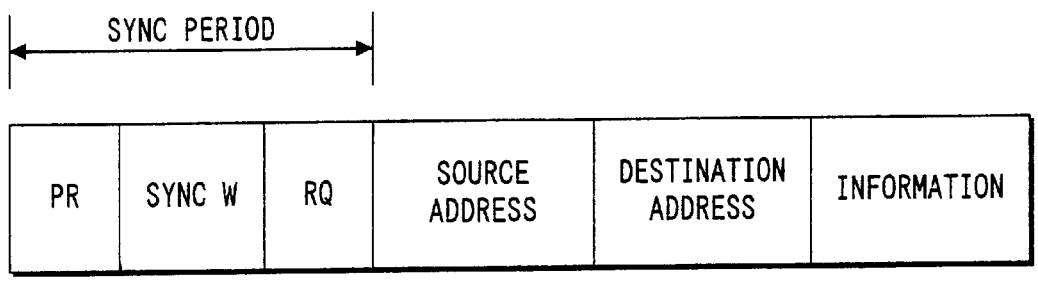
FIG. 2A is a diagram showing an example of a control signal frame format used in the embodiment.
Figure 2B:
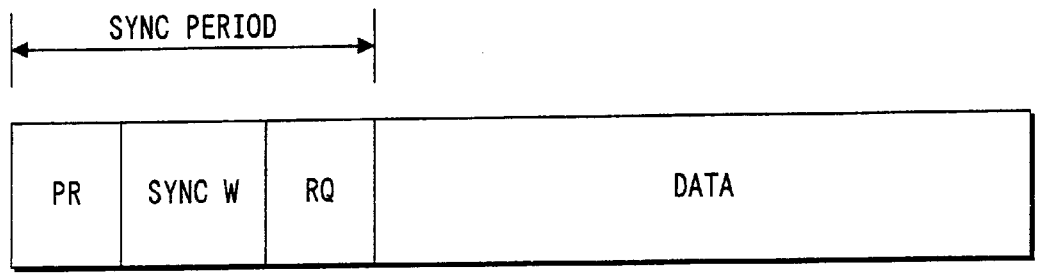
FIG. 2B is a diagram showing an example of a data signal frame format used in the embodiment.

Referring to FIGS. 2A and 2B, the multiplexer 102 multiplexes the transmission data and the communication request data RQ to produce a frame of transmission data such that the communication request data RQ is located in a synchronization period of the frame following a synchronization word (SYNC W) and a preamble (PR). Therefore, the RQ detector 107 is capable of detecting the communication request data RQ from the reception baseband signal according to the bit and frame synchronization supplied from the sync detector 106.

NETWORK

Figure 3:
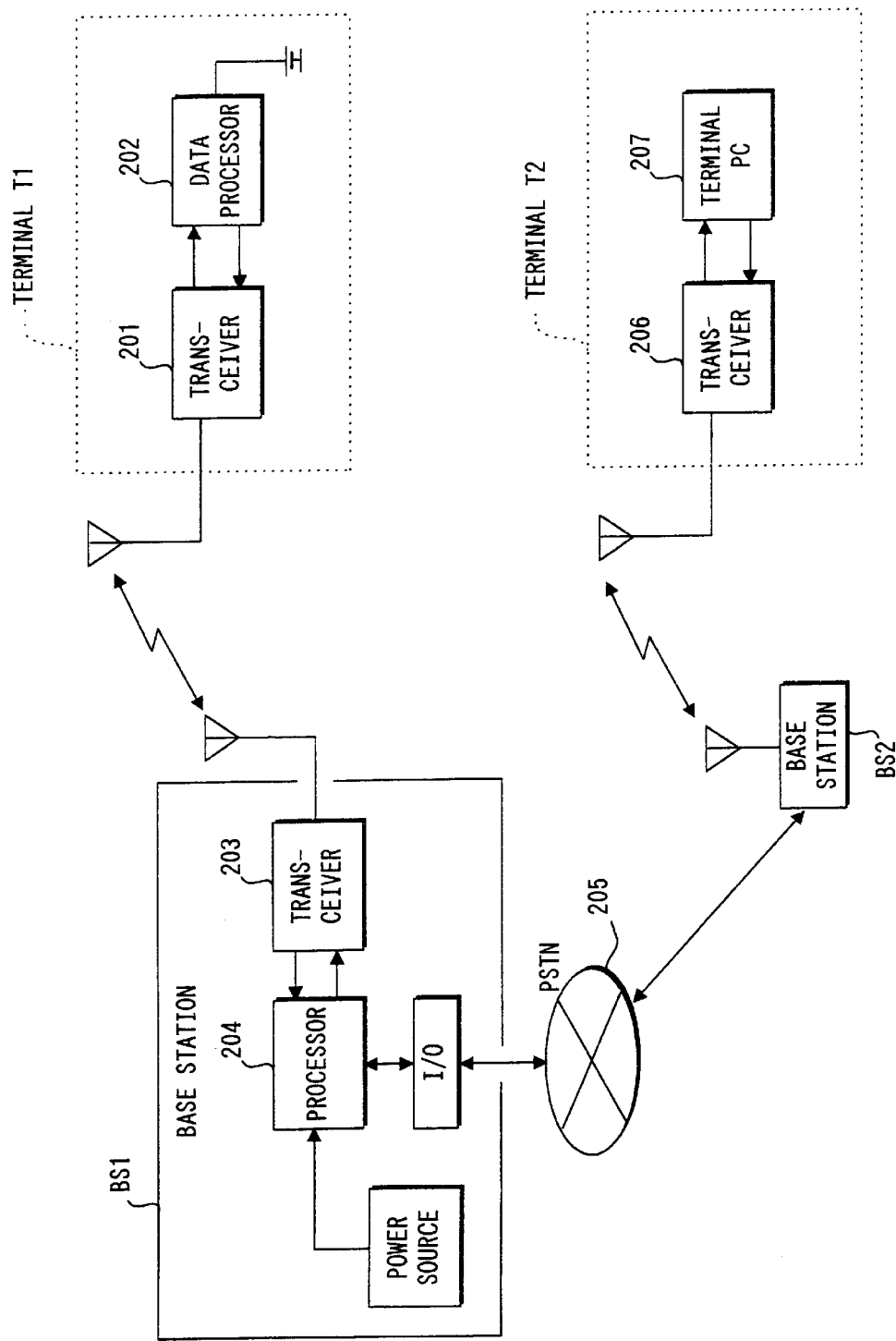
FIG. 3 is a schematic diagram showing an embodiment of a network according to the present invention.

As shown in FIG. 3, a radio communication network is comprised of a plurality of base stations and a plurality of terminals. According to the present invention, each terminal and each base station are provided with the transceiver as shown in FIG. 1.

Referring to FIG. 3, a terminal T1 includes a transceiver 201, a data processor 202 and other necessary devices including a keypad, a speaker and a microphone. A base station BS1 is provided with a transceiver 203, a data processor 204 and other necessary devices. In this embodiment, the base station is connected to public switched telephone network (PSTN) 205. The base station may be connected to a subscriber line of a switching system and has the same configuration as another base station BS2 in the network. Another terminal T2 includes a transceiver 206 which is connected to a terminal PC (personal computer) 207. Hereinafter, it is assumed that the terminal T2 receives a calling signal from the terminal T1 through the base stations BS1 and BS2 and the PSTN 205.

ORIGINATING TERMINAL

In the transceiver 201 of the originating terminal T1, the transmission data detector 101, the receiver 105, the first power supply line 110 is intermittently powered on and off in the predetermined period and the second power supply line 111 is not supplied with power while in the wait state. Therefore, the multiplexer 102, the modulator 103, the transmitter 104, and the demultiplexer 108 are powered off in the wait state. When the transmission data detector 101 detects transmission data including the source address of its own and the destination address (here, the terminal T1), the multiplexer 102 multiplexes the transmission data and the communication request data RQ to produce a frame of transmission data as shown in FIG. 2A. At the same time, the power controller 109 fully activates all the circuits of the transceiver 201 so as to allow transmission and reception.

BASE STATIONS

In the base station BS1, when the transceiver 203 is in the wait state, the circuits other than the transmission data detector 101, the receiver 105, the sync detector 106 and the RQ detector 107 are powered off. When the receiver 105 receives the calling signal from the terminal T1 and the RQ detector 107 detects the communication request data RQ from the reception baseband signal, the power controller 109 fully activates all the circuits of the transceiver 203 so as to allow transmission and reception.

Subsequently, the processor 204 produces transmission data from the reception data and transmits it to the base station BS2 through the PSTN 205. In cases where the destination address is registered in its memory, the processor 204 may produce transmission data addressed to the terminal T2 and the transceiver 203 transmits a calling signal including the communication request data RQ to the terminal T2.

Since the base station BS2 has the same configuration as the base station BS1, the same numerical references as the base station BS1 will be used. When the base station BS2 receives a calling signal addressed to the terminal T2 from the base station BS1 through the PSTN 205, the processor 204 produces transmission data addressed to the terminal T2 and outputs it to the transceiver 203. When receiving the transmission data from the processor 204, the transmission data detector 101 produces the communication request data RQ which is output to the multiplexer 102 and the power controller 109. The power controller 109 fully activates all the circuits of the transceiver so as to allow transmission and reception.

DESTINATION TERMINAL

When the transceiver 206 is in the wait state, the circuits other than the transmission data detector 101, the receiver 105, the sync detector 106 and the RQ detector 107 are also powered off. In the case where the receiver 105 receives the calling signal from the base station BS2 and the RQ detector 107 detects the communication request data RQ from the reception baseband signal, the power controller 109 fully activates all the circuits of the transceiver 201 so as to allow transmission and reception.

In this manner, the terminals T1 and T2 are allowed to communicate with each other. Since a signal frame includes the communication request data RQ as shown in FIGS. 2A and 2B, the respective transceivers of the terminals T1 and T2 and the base stations BS1 and BS2 are fully activated during communication. When the communication is terminated, the communication request data RQ is no longer received. Therefore, after waiting until a lapse of a predetermined time period longer than the frame period, the transceivers return to the wait state.

Referring to FIG. 4 where an operation of the transceiver of FIG. 1 is shown, when no communication request data RQ is received while in the wait state, the power controller 109 intermittently supplies power to the first power supply line 110 in the predetermined period and does not supply power to the second power supply line 111. The predetermined period may be set to be approximately the frame period T (e.g. 125 μsec). This causes the power consumption of the first power supply line 110 to be reduced in the wait state.

When communication request data RQ is received, the power controller 109 powers on the first and second power supply lines 110 and 111 to allow transmission and reception. Since communication request data RQ is received during the communication, the first and second power supply lines 110 and 111 continue to be powered on. When the communication is completed, communication request data RQ is no longer received. Therefore, after waiting until a lapse of the predetermined time period $T_W$ longer than the frame period T, the power controller 109 returns to the wait state.

What is claimed is:

1. A transceiver provided in each of a plurality of stations forming a communication network, comprising:
    a transmission circuit including a first input detector and at least one other element;
    a reception circuit including a second input detector and at least one other element, the first and second input detectors for detecting an input signal to the transceiver; and
    a power controller for controlling the first and second input detectors separately from all other elements of the transceiver such that all elements of the transceiver except for the first and second input detectors are powered off during a first state in which no input signal is detected and such that all elements of the transceiver are powered on in a second state in which an input signal is detected, wherein the power controller further powers on and off the first and second input detectors intermittently during the first state in which no input signal is detected.

2. The transceiver according to claim 1, further comprising:
    a first power supply line connected to the first and second input detectors; and
    a second power supply line connected to all other elements within the transceiver,
    wherein the power controller intermittently supplies power to the first power supply line and does not supply power to the second power supply line during the first state, and the power controller supplies power to the first and second power supply lines during the second state.

3. The transceiver according to claim 1, wherein the first input detector comprises a transmission detector for detecting a first input signal which is to be transmitted; and
    wherein the second input detector comprises a reception detector for detecting a second input signal which was received,
    wherein a detected input signal to the transceiver is one of the first and second input signals.

4. The transceiver according to claim 1, wherein
    the first input detector comprises a transmission detector for detecting a presence or absence of transmission data to produce first communication request data when a presence of transmission data is detected,
    the second input detector comprises a reception detector for detecting a presence or absence of reception data to produce second communication request data when a presence of reception data is detected, and
    the transmission circuit further comprises a multiplexer for multiplexing transmission data and first communication request data to produce a transmission frame; and
    wherein a detected input signal to the transceiver is one of the transmission data and the reception data.

5. The transceiver according to claim 4, wherein the first communication request data is located in a synchronization period of the transmission frame and the second communication request data is located in a synchronization period of a reception frame of the reception data, and wherein a length of the transmission frame is the same as that of the reception frame.

6. The transceiver according to claim 5, wherein the power controller further powers on and off the first and second input detectors during the first state according to a predetermined timing period which is substantially set to the length of the transmission frame and the reception frame.

7. A transceiver provided in each of a plurality of stations forming a communication network, comprising:
    a transmission circuit which comprises
        a transmission detector for detecting transmission data to produce first communication request data when transmission data is detected, and
        a transmitter for producing a transmission signal having frames containing the detected transmission data and the first communication request data;
    a reception circuit which comprises
        a receiver for producing reception data from a reception signal having a plurality of frames, the reception data including second communication request data, and
        a reception detector for detecting the second communication request data in the reception data; and
    a power controller for controlling the receiver and the reception and transmission detectors separately from all other elements of the transceiver such that all elements of the transceiver except for the receiver and the reception and transmission detectors are powered off during a first state where neither the first communication request data nor the second communication request data is detected, and such that the entire transceiver is powered on during a second state where at least one of the first communication request data and the second communication request data is detected, wherein the power controller further powers on and off the receiver and the reception and transmission detectors intermittently during the first state in which neither the first nor second communication request data is detected.

8. The transceiver according to claim 7, wherein the first communication request data is located in a synchronization period of a transmission frame and the second communication request data is located in a synchronization period of a reception frame, and wherein a length of the transmission frame is the same as that of the reception frame.

9. The transceiver according to claim 8, wherein the power controller powers on and off the receiver and the reception and transmission detectors according to a predetermined timing period which is substantially set to the length of the transmission frame and the reception frame.

10. The transceiver according to claim 7, further comprising:
    a first power supply line connected to the receiver and the reception and transmission detectors; and
    a second power supply line connected to all elements of the transceiver other than the receiver and the reception and transmission detectors,
    wherein the power controller intermittently supplies power to the first power supply line and does not supply power to the second power supply line during the first state, and the power controller supplies power to the first and second power supply lines during the second state.

11. The transceiver according to claim 7, wherein the reception detector comprises:
    a sync detector for detecting a synchronization signal from the reception data; and
    a request detector for detecting the second communication request data from the reception data based on the synchronization signal.

12. A power-saving method of a transceiver provided in each of a plurality of stations forming a communication network, each transceiver comprising:

a transmission circuit which includes a first input detector and at least one other element, a reception circuit which includes a second input detector and at least one other element, a first power supply line connected to the first and second input detectors, and a second power supply line connected to all elements of the transceiver other than the first and second input detectors;

the method comprising the steps of:

a) detecting a presence or absence of an input signal according to power supplied through the first power supply line;

b) powering on and off the first power supply line intermittently during a first state in which no input signal is detected;

c) powering off the second power supply line during a first state in which no input signal is detected; and d) powering on the first and second power supply lines during a second state in which an input signal is detected, wherein the powering on and/or off of the first power supply line is controlled separately from the powering on and/or off of the second power supply line.

13. The power-saving method according to claim 12, wherein the step a) comprises:

detecting a first input signal which is to be transmitted; and detecting a second input signal which was received, wherein the input signal is one of the first and second input signals.

14. The power-saving method according to claim 12, wherein the step a) comprises the steps of detecting a presence or absence of transmission data to produce first communication request data when a presence of transmission data is detected; and detecting a presence or absence of reception data to produce second communication request data when a presence of reception data is detected, and wherein the method further comprises the step of multiplexing the transmission data and the first communication request data to produce a transmission frame when a presence of transmission data is detected.

15. The power-saving method according to claim 14, wherein the first communication request data is located in a synchronization period of the transmission frame and the second communication request data is located in a synchronization period of a reception frame of the reception data, and wherein a length of the transmission frame is the same as that of the reception frame.

16. The power-saving method according to claim 15, wherein the first power supply line is powered on and off according to a predetermined timing period which is substantially set to the length of the transmission frame and the reception frame.

* * * * *